United States Patent
Van Doorselaer et al.

(10) Patent No.: US 6,650,634 B1
(45) Date of Patent: Nov. 18, 2003

(54) INTERNET ACCESS METHOD

(75) Inventors: Bart Alfons Peter Van Doorselaer, Ghent (BE); Bernard Henry Daniel Sales, Brussels (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/267,375

(22) Filed: Mar. 15, 1999

(30) Foreign Application Priority Data

Dec. 22, 1998 (EP) ............................................. 98403274

(51) Int. Cl.[7] ............................................... H04L 12/66
(52) U.S. Cl. ....................................... 370/352; 370/401
(58) Field of Search ................................ 370/401, 352, 370/400, 356, 410; 709/223, 225, 220, 222; 379/88.17

(56) References Cited

U.S. PATENT DOCUMENTS

| | | | | |
|---|---|---|---|---|
| 5,774,660 A | * | 6/1998 | Brendel et al. ............. | 709/225 |
| 5,790,548 A | * | 8/1998 | Sistanizadeh et al. ....... | 370/401 |
| 6,069,890 A | * | 5/2000 | White et al. ................ | 370/352 |
| 6,125,113 A | * | 9/2000 | Farris et al. ............... | 370/401 |
| 6,192,045 B1 | * | 2/2001 | Williams et al. ............ | 370/352 |
| 6,249,813 B1 | * | 6/2001 | Campion et al. ............ | 709/223 |
| 6,304,637 B1 | * | 10/2001 | Mirashrafi et al. ........ | 379/88.17 |
| 6,324,264 B1 | * | 11/2001 | Wiener et al. ............. | 379/88.17 |
| 6,430,282 B1 | * | 8/2002 | Bannister et al. ......... | 379/88.17 |
| 6,438,218 B1 | * | 8/2002 | Farris et al. ............. | 379/88.17 |

OTHER PUBLICATIONS

Chul–Jin Parrk, et al.: "The Improvement for Integrity between DHCP and DNS" Proceedings. High Performance Comuting on the Information Superhighway HPC Asia 1997 (CAT. No, 98TB100110), Seoul, South Korea, Apr. 28–May 2, 1997, pp. 511–516, XP002110636, 1997, Los Alamitos, CA, USA, IEEE Comput. Soc. Press, USAISBN: 0–8186–7901–8.

Foo S. et al: "Approached for Resolving Dynamic IP Addressing" Internet Research Electronic Networking Application and Policy, vol. 7, No. 3, Jan. 1, 1997, pp. 208–216, XP000199862 ISSN: 1066–2243.

Andrew S. Tanenbaum, "DNS—Domain Name System", pp. 622–6331, COMPUTER NETWORKS, Third Edition.

ITU–Standard H.323—AUDIOVISUAL AND MULTIMEDIA SYSTEMS, Infrastructure of Audiovisual Services—Systems and Terminal Equipment for Audiovisual Services, Feb. 1998.

* cited by examiner

Primary Examiner—Steven Nguyen
Assistant Examiner—Phuongchau Ba Nguyen
(74) Attorney, Agent, or Firm—Sughrue Mion, PLLC

(57) ABSTRACT

A network contains at least two hosts, coupled to a network, a first and a second host. Besides these hosts there is a name system and an access node, both connected to the internet network. If the first host wants to contact the second host, this first host will request the name system for the Internet address. The name system will search, based on the host name of the second host for the Internet address of this host. If this second host is not active, the name server requests the access node to establish a connection between this access node and the second host. The access node will also assign then an internet address to this second host. Subsequently the access node will forward the assigned internet address of the second host to the name system which on its turn will forward the assigned internet address to the requesting, first host. Now, by using the assigned internet address, the first host is able to contact the second host.

10 Claims, 3 Drawing Sheets

INTERNET ACCESS METHOD

BACKGROUND OF THE INVENTION

The present invention relates to a method for Internet Access as described in the preamble of claim 1, a related system as described in the preamble of claim 4, and related devices as described in the preamble of claims 7 and 10.

Such a method for Internet Access is already known in the art, e.g. from the section DNS —Domain Name System, pages 622–631, in "*Computer Networks*" third edition, from the author Andrew S. Tanenbaum.

Therein it is described that, a name system NS, called a Domain Name System, is queried by a requesting host, called "an application program". The requesting host provides the Domain Name System with the host-name of the host to be contacted. The Domain Name System then starts searching for the internet address and if it is found, returns the internet address called the IP-address, to the requesting host.

If a first host tries to contact a second host connected to the Internet, it will generally not know the internet address of the second host, but only a host name. Therefor, it will give the host name of the second host to the name system NS, which returns the internet address of the second host to the first host. In case the second host is not active (i.e. not connected to the internet), no internet address is assigned to this second host and consequently there is no internet address available in the name system NS. At a request for the address of this second host, the involved name system returns to the initiating host that the second host is unknown.

SUMMARY OF THE INVENTION

An object of the present invention is to provide a method for Internet Access of the above known type but wherein the second host can be reached at any time without the need of a permanent internet connection.

According to the invention, this object is achieved by the method as described in claim 1, the system described in claim 4 and the devices as described in the respective claims 7 and 10.

Indeed, due to the fact that the Name System NS, in case of non-availability of internet address takes the initiative to request the access node AN with the host to be contacted to establish a connection. By establishing the connection between the access node AN and the host to be contacted, an internet address is assigned to the host. The access node AN then returns the assigned internet address to the Name System NS which in its turn returns the internet address to the requesting host.

Another characteristic feature of the present invention is defined in claims 2, 5 and 8.

The name system NS functionality can be performed by a distributed Domain Name System DNS as described in the above cited prior art article.

Further characteristic features of the present invention is defined in claim 3, 6 and 9.

The name system NS functionality can be performed by a gatekeeper. The functionality of this gatekeeper is defined in ITU-standard H.323": AUDIOVISUAL AND MULTIMEDIA SYSTEMS: Infrastructure of audiovisual services —Systems and terminal equipment for audiovisual services"

BRIEF DESCRIPTION OF THE DRAWING

The above and other objects and features of the invention will become more apparent and the invention itself will be best understood by referring to the following description of an embodiment taken in conjunction with the accompanying drawings wherein.

Figure 1:
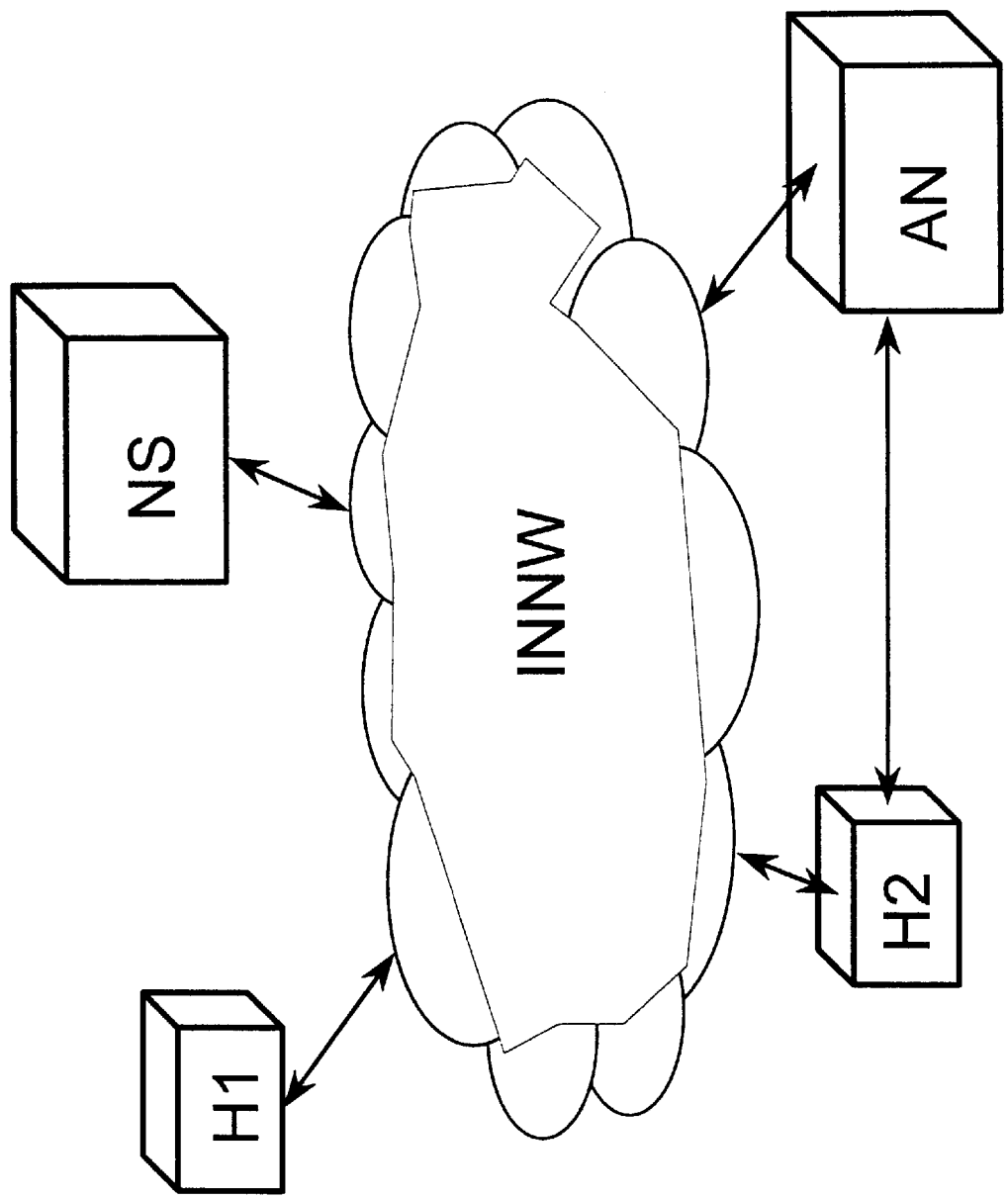
FIG. 1 represents an internet network wherein the implementation of the present invention is realised.

In the following paragraphs, referring to the drawings, an internet access system will be described. In the first paragraph of this description the main elements of this internet access system are described. In the second paragraph, all connections between the elements and described means are defined. In the succeeding paragraph the actual execution of the internet access system is described.

DETAILED DESCRIPTION OF THE INVENTION

The internet network INNW of this present invention is assumed to have connected to it a number of hosts, a name system NS and a number of access nodes through which at least some of the before mentioned hosts are connected to the internet network INNW. To explain the execution of the present invention, only two hosts are necessary, a first host HI and a second host H2, the name system NS and only one access node AN. In this embodiment the name system NS is implemented by a Domain name System. The access node is implemented with a commercial available remote access node for instance a remote access node of the MAX-family remote access nodes provided by Ascend.

The first host H1 and the name system NS are coupled to the internet network INNW. Through the internet there is a coupling between the first host HI and the Name system NS.

The access node AN is also coupled to the internet network INNW. The before mentioned second host H2 can be coupled to the internet network INNW directly or through the access node AN.

Figure 2:
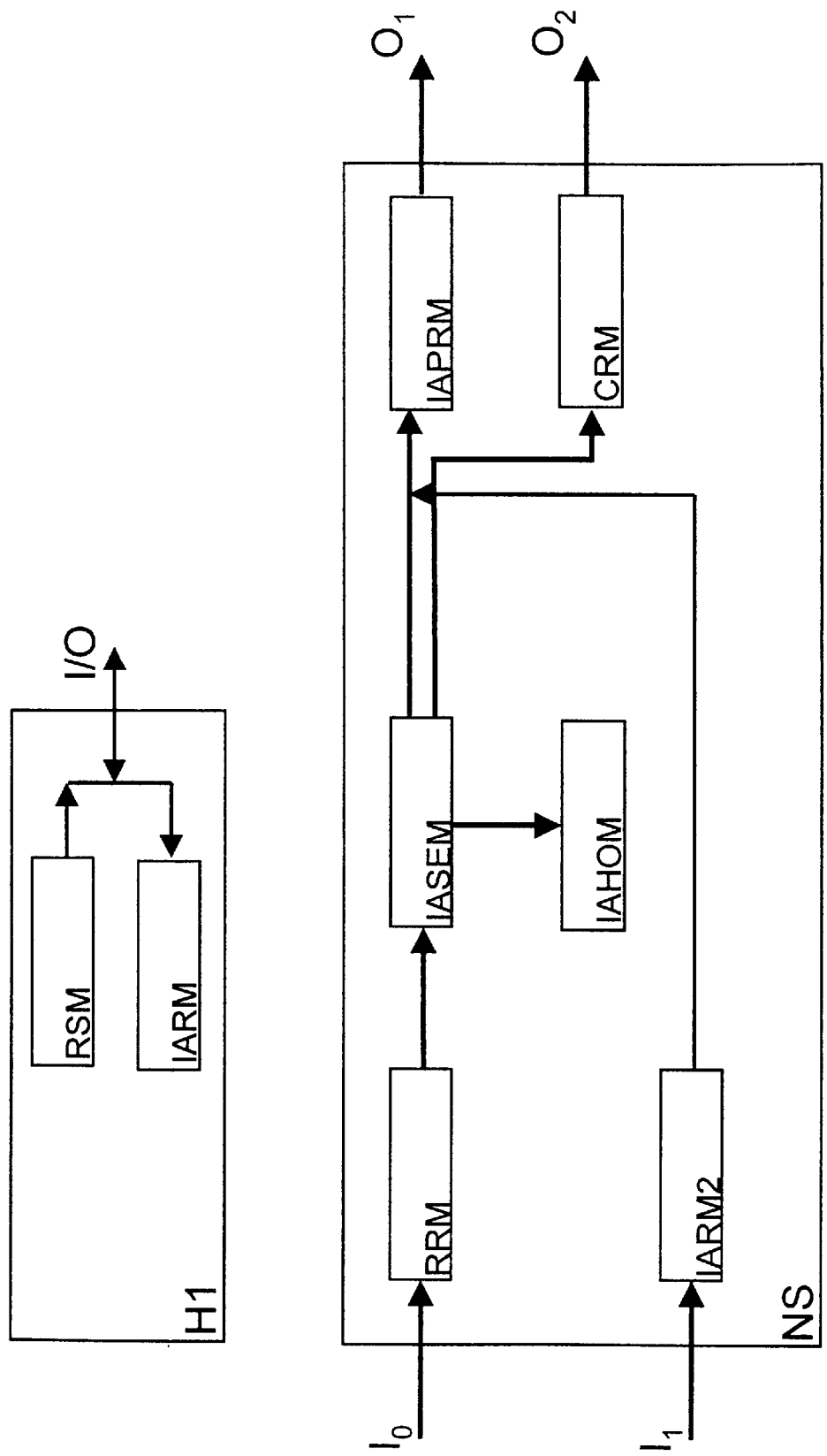
FIG. 2 represents the name system NS and the host H1 as used in FIG. 1.

The first host H1, as shown in FIG. 2, contains a request sending means RSM which takes care of requesting the IP-address of another host to be contacted and an internet address reception means IARM which will receive the internet address of the host to be contacted.

The request sending means RSM has an output-terminal which is tied together with an input-terminal of the an internet address reception means IARM in the input/output-terminal I/O of the first host H1. The input/output-terminal I/O of first host Hi is coupled to the internet network INNW.

Another main element of the present invention is the name system NS. Usually this name system NS is implemented by a number of geographical over the internet network spreaded distributed Domain Name Systems. These distributed Domain Name Systems search the IP-address of hosts connected to the internet when providing the domain name of that host to the domain name system. This search is done in co-operation between all of these distributed domain name systems. In the further description, all distributed domain name systems are taken together in one domain name system, represented by name system NS, which is functional identical to the distributed system consisting of a number geographical spreaded elements.

Name system NS, as presented in FIG. 2, contains a request receiving means RRM which is able to receive via the internet network INNW a request for an internet address of the second host H2 from host H1. Then an internet address searching means IASEM included in name system NS handles the search of the IP-address of the second host H2. The internet address holding means IAHOM contains a list of internet names, one for each host connected, each associated with the corresponding IP-address. Besides these means the name system NS contains an internet address provisioning means IAPRM which provides the requesting host H1 with the requested IP-address of the second host H2. There is also a connection establishment requesting means CRM, able to request the access node AN to establish a connection between this access node AN and the second Host H2 if the internet address of the second host H2 is not available within the name system NS. The name system NS also contains an internet address reception means IARM2 which receives the internet address of the second host H2 from the access node AN.

The request receiving means RRM, has an input-terminal $I_0$ coupled to internet network INNW which is also an input-terminal of the name system NS. This request receiving means RRM is coupled to the internet address searching means IASEM which on its turn is coupled to the internet address provisioning means IAPRM and to the connection establishment requesting means CRM. The internet address provisioning means IAPRM has an output-terminal $O_1$ which is also an output-terminal of the name system NS. The connection establishment requesting means CRM has also an output-terminal $O_2$, which is also an output-terminal of name system NS. The internet address holding means IAHOM is coupled to the internet address searching means IASEM. Both output-terminals $O_1$ and $O_2$ are coupled to the internet network INNW. At last, the internet address reception means IARM2, has an input-terminal 1, coupled to internet network INNW which is also an input-terminal of the name system NS. This internet address reception means IARM2 is coupled to said internet address provisioning means IAPRM.

Figure 3:
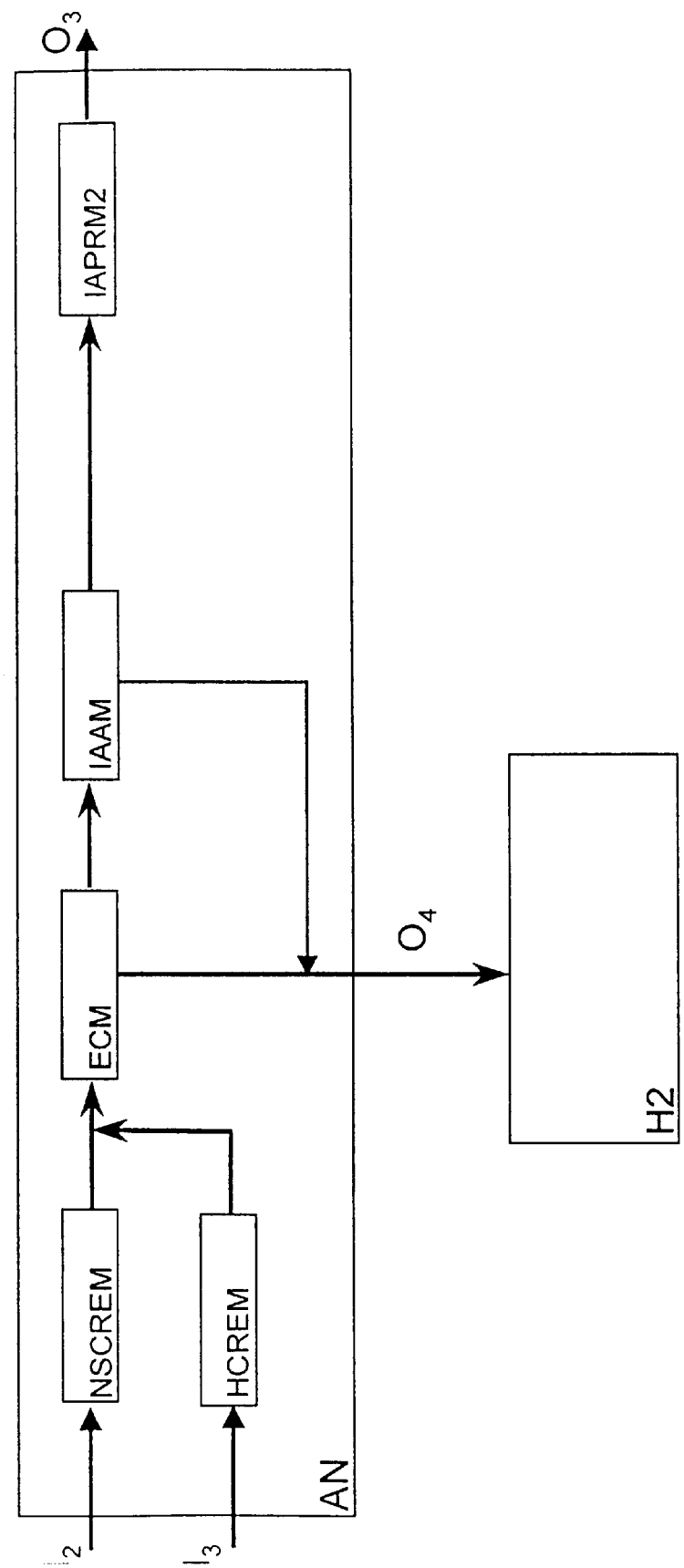
FIG. 3 represents the access node AN as shown in FIG. 1.

A further relevant element is, as before mentioned, the access node AN, which is presented in FIG. 3. The access node AN is, as will be explained later on, responsible for connecting a host, in this case host H2, which is not active, to the internet.

This access node AN contains a name server connection establishment request reception means NSCREM adapted to receive a request from the name system NS to establish a connection between the access node AN and the second host H2 and a connection establishment request reception means HCREM which takes care of the reception of a request to establish a connection between the access node AN and the host to be connected H2, is included in the access node AN. The access node AN also contains a connection establishing means ECM realising the actual connection establishment and an internet address assigning means IAAM which assigns the IP-address to host H2. The last means to be mentioned which is also contained in the access node AN is an internet address provisioning means IAPRM2 which provides the name system NS with the requested IP-address.

The connection establishment request reception means HCREM has an input-terminal $I_3$ which is also an input-terminal of the access node AN. Besides this the name server connection establishment request reception means NSCREM has also has an input-terminal $I_2$ which is also an input-terminal of the access node AN. Both the name server connection establishment request reception means NSCREM and the said host connection establishing request reception means HCREM are coupled to connection establishing means ECM which on its turn is coupled to internet address assigning means IAAM. The internet address assigning means IAAM is coupled to the internet address provisioning means IAPRM2. This internet address provisioning means IAPRM2 has an output-terminal $O_3$ which is also an output-terminal of the access node AN. At last the connection establishing means ECM and the internet address assignment means IAAM both have an output-terminal which tied together forms an output-terminal $O_4$ of the access node AN. Input-terminals $I_2$ and $I_3$, and output-terminal $O_3$ are coupled to the internet network INNW, output-terminal O4 is coupled to host H2.

In order to explain the execution of the present invention it is supposed that the first host H1 has the intention to communicate with the second host H2.

To contact the second host H2, the first host Hi needs the IP-address of this second host H2. It is also supposed that the first host H1 only knows the internet name of the second host H2. To determine this IP-address, the first host H1 requests the name system NS to provide the firsts host H1 with the internet address of the second host. The request sending means RSM of the first host H1 sends a requests for the IP-address of second host H2, together with the internet name of the second host H2, to the request receiving means RRM of the name system NS. The request receiving means RRM of the name system NS passes the request together with the internet name of second host H2 to the internet address searching means IASEM which starts searching in the table of the internet address holding means IAHOM. This table contains a list of internet names of all, to the internet network INNW connected hosts, each linked to the corresponding IP- address. So if the second host is active, the internet address searching means IASEM will find the IP-address. The internet address provisioning means IAPRM will pass this IP-address then to the internet address reception means IARM of first host H1 which now will be able to contact second host H2.

But, we further suppose that the second host is not active, i.e. not connected to the internet network INNW. In this situation there is no IP-address is assigned to this second host H2 and consequently there is no IP-address available in the table of the name system NS.

In this case, the connection establishment requesting means CRM requests the access node AN to establish a connection between this access node AN and the second, inactive host H2. The name system connection establishment requesting means NSCREM of the access node AN receives the request to establish the mentioned connection and instructs the connection establishing means ECM to establish the connection between the access node AN and the second host H2. Subsequently the internet address assignment means IAAM picks an IP-address from a pool of available IP-addresses held by the access node AN and assign this IP-address to the second host H2. The assigned IP-address is passed towards the requesting name system NS by the internet address provisioning means IAPRM2.

The internet address reception means IARM2 of name system NS then receives the IP-address of second host H2 and forwards it, by means of the Internet address providing means IAPRM, to the Internet address reception means IARM of first host H1. First host H1 is now able to contact second host H2, which is active at the moment.

In this described embodiment, a Domain Name system is chosen for implementing the name system NS. An equivalent alternative would have been the use of a gatekeeper, as before described, to implement the name system NS over the internet network INNW.

While the principles of the invention have been described above in connection with specific apparatus, It is to be clearly understood that this description is made only by way of example and not as a limitation on the scope of the invention, as defined in the appended claims.

Additionally the following remark has to be made: in spite of the functional level of the description of the invention, a person skilled in the art is expected to be able to derive an implementation from the mentioned description.

What is claimed is:

1. A method for internet access to an Internet network containing a plurality of hosts each coupled to at least one remote access nodes, and a name system containing a list of Internet names each associated with an internet address, said method being used when a first host of said plurality of hosts tries to access a second host of said plurality of hosts, said method comprising:
    a. sending a request for an Internet address of said second host from said first host to said name system;
    b. receiving in said name system a request for said internet address of said second host;
    c. searching in said name system for said Internet address; and
    d. providing from said name system to said first host, said internet address of said second host;
wherein the following are performed between said steps c and d in case said internet address is not available at said name system:
    e. sending a request from said names system to said access node to establish a connection between said access node and said second host;
    f. receiving by said access node of said request, from said name system, to establish a connection between said access node and said second host;
    g. establishing said connection by said access node;
    h. assigning an Internet address to said second host by said access node; and
    i. providing said Internet address of said second host to said name system.

2. The method according to claim 1, wherein said name system is a distributed Domain Name System.

3. The method according to claim 1, wherein said name system is a gatekeeper.

4. An Internet access system used for access to an Internet network containing a plurality of hosts each coupled to at least one access nodes, and a name system containing a list of internet names each associated with an internet address, said system being used when a first host of said plurality of hosts tries to access a second host of said plurality of hosts, said system comprising:
    a. request sending means, adapted to send a request for an Internet address of said second host to said name systems;
    b. request receiving means, adapted to receive in said name system said request for said Internet address of said second host;
    c. internet address searching means, coupled with an input to an output of said request receiving means and adapted to search in said name system for said Internet address;
    d. internet address provisioning means, coupled with an input to an output of said internet address searching means and adapted to provide from said name system to said first host said internet address of said second host;
    e. connection establishment requesting means, coupled with an input to a second output of said internet address searching means and adapted to request, if said internet address of said second host is not available at said name system, said access node to establish a connection between said access node and said second host;
    f. name system connection establishment request reception means adapted to receive a request from said name system to establish a connection between said access node and said second hosts;
    g. connection establishing means, coupled with an input to an output of said name system connection establishment request reception means and adapted to establish a connection between said access node and said second host upon reception of a connection establishment request send by said name system;
    h. internet address assigning means, coupled with an input to an output of said connection establishing means and adapted to assign an internet address to said second Host;
    i. internet address provisioning means, coupled with an input to an output of said internet address assigning means and adapted to provide said name system with said internet address; and
    j. internet address reception means, coupled with an output to said input of said internet address provisioning means in said name system and adapted to receive said internet address by said name system from said access node.

5. The internet access system according to claim 4, wherein said name system is a distributed Domain Name System.

6. The internet access system according to claim 4, wherein said name system is a gatekeeper.

7. A name system, to be used for access to an internet network comprising in addition to said name system, a plurality of hosts and at least one access node, said name system comprising:
    a. internet address holding means, adapted to hold a list of internet Names each associated with an Internet address;
    b. request receiving means, adapted to receive a request for an internet address of a second host from a first host;
    c. internet address searching means, coupled with an input to an output of said request receiving means and adapted to search said internet address of said second host; and
    d. internet address provisioning means, coupled with an input to an output of said internet address searching means and adapted to provide said first host with said Internet address of said second host;
    e. connection establishment requesting means, coupled with an input to a second output of said internet address searching means and adapted to request, if said internet address of said second host is not available at said name system, said access node to establish a connection between said access node and said second Host; and
    f. internet address reception means, coupled with an output to said input of said internet address provisioning means in said name system and adapted to receive said internet address by said name system from said access node and to provide said internet address provisioning means.

8. The name system according to claim 7, wherein said name system is a distributed Domain Name System.

9. The name system according to claim 7, wherein said name system is a gatekeeper.

10. An access node to be used for access to an internet network, the access node being coupled to at least one of a plurality of hosts and to at least one name system containing a list of internet names, each of the names being associated with an internet address, said access node comprising:

a. name server connection establishment request reception means, adapted to receive from said name system a connection establishment request indicating a given host;

b. connection establishing means, coupled to an output of said name server connection establishment request reception means, and responding to said connection establishment request by establishing a connection between said access node and said given host indicated in said connection establishment request c. internet address assigning means, coupled to an output of said connection establishing means, and adapted to assign an internet address to said given host; and d. internet address provisioning means, coupled to an output of said internet address assigning means, and adapted to provide said name system with said Internet address of said given host.

* * * * *